A. LINDSEY.
Bark Mill.
No. 4,335.    Patented Dec. 26, 1845.
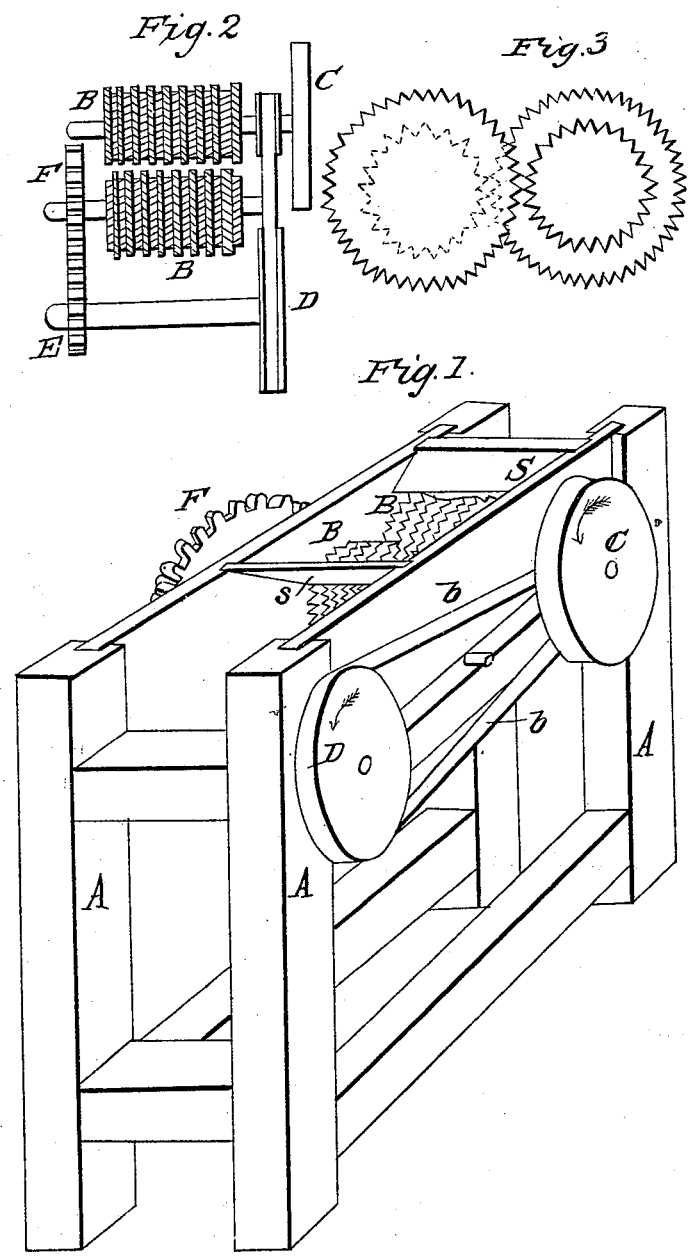

UNITED STATES PATENT OFFICE.

AMOS LINDSEY, OF CANTON, MAINE.

MILL FOR GRINDING BARK, &c.

Specification of Letters Patent No. 4,335, dated December 26, 1845.

*To all whom it may concern:*

Be it known that I, AMOS LINDSEY, of Canton, in the county of Oxford, in the State of Maine, have invented a new and useful improvement for grinding bark, sumac, medicinal roots, corn and cobs, or other materials, called "Lindsey's Grater," of which the following is a full and exact description, reference being had to the accompanying drawings.

Figure 1, represents the machine in perspective when in action.

A, A, A, is the frame work.

B, B represents two cylinders composed of circular saws fastened upon shafts and propelled by any suitable power applied to the pulley C. On the same shaft with C, is a smaller pulley seen in the drawing from which a band ($b$, $b$,) passes to the pulley D. The shaft of this pulley D passes across the frame and has upon the other extremity a pinion which matches into the cogs of the large cogwheel F. This wheel (F,) is attached to the shaft of one of the cylinders and turns it slowly so as to feed in whatever is placed upon it and at the same time assists the other cylinder of saws in cutting up the substance to the required fineness.

Fig. 2, is a bird's eye view of the arrangement of saws and pulleys showing their connection more clearly.

B, B are the cylinders of saws placed with a large one and a small one alternately and the cylinders, which in the drawing are represented a little distance from each other are so placed that the large saws of one cylinder meet the small saws of the other.

C, is the driving pulley, with the small pulley on the same shaft.

C, C, represents the band passing from the small pulley to the large pulley D.

E, is the pinion on the shaft with D. F, the large cog wheel which matches the pinion E, and is turned together with the cylinder of saws on its shaft slowly while the other cylinder driven by the pulley C.

Fig. 3 represents the manner in which the saws are placed so as to bring a large saw opposite to a small one.

Operation: For cutting sumac or fibrous materials I usually place a table on a level with the top of the first cylinder of saws and thus feed in so that it will be brought between the saws which turn toward each. The slow cylinder feeds in and holds the material while the quick cylinder cuts it up. For ears of corn I put in the slides above the cylinders as represented in Fig. 1 ($s$, $s$,) so as to form a hopper.

What I claim as my improvement and for which I ask an exclusive right, is—

My mode of combining and applying two or more cylinders of circular saws as above described, viz., by alternating large and small saws and applying them to each other so that a large and small saw shall be opposite, and cut against each other.

In testimony whereof I the said AMOS LINDSEY hereto subscribe my name in the presence of the witnesses whose names are hereto subscribed on the second day of August A. D. 1845.

AMOS LINDSEY.

Signed in our presence:
SAM. WOOD, Jr.,
EZEKIEL HOLMES.